(12) United States Patent
Pasupathy et al.

(10) Patent No.: US 10,691,337 B2
(45) Date of Patent: Jun. 23, 2020

(54) ARTIFICIAL INTELLIGENCE AND MACHINE LEARNING SYSTEMS AND METHODS FOR A STORAGE SYSTEM

(71) Applicant: NETAPP, INC., Sunnyvale, CA (US)

(72) Inventors: Shankar Pasupathy, Milpitas, CA (US); Samya Maiti, Bangalore (IN); Shubhvardhan Manjayya, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/388,735

(22) Filed: Apr. 18, 2019

(65) Prior Publication Data

US 2020/0125260 A1  Apr. 23, 2020

(30) Foreign Application Priority Data

Oct. 18, 2018 (IN) .............................. 201841039576

(51) Int. Cl.
*G06F 3/06* (2006.01)
*G06N 20/00* (2019.01)

(52) U.S. Cl.
CPC ............ *G06F 3/0604* (2013.01); *G06F 3/067* (2013.01); *G06F 3/0617* (2013.01); *G06F 3/0683* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 9,235,801 B2 | 1/2016 | Portegys et al. | |
| 2016/0246819 A1 | 8/2016 | Cosic | |
| 2017/0068675 A1 | 3/2017 | Hazel et al. | |
| 2017/0169358 A1 | 6/2017 | Choi et al. | |

OTHER PUBLICATIONS

The San Guy; "Machine Learning, Cognitive Computing, and the Storage Industry"; thesanguy.com; Jul. 13, 2017; 13 pages; https://thesanguy.com/2017/07/13/machine-learning-cognitive-computing-and-the-storage-industry/.

*Primary Examiner* — Yong J Choe
(74) *Attorney, Agent, or Firm* — Klein, O'Neill & Singh, LLP

(57) ABSTRACT

Computing technology using artificial intelligence/machine learning methods and systems for a storage system is provided. One method includes measuring by a processor, a first metric indicating health of a first storage system in storing and retrieving data; quantifying by the processor, the first metric based on comparison of the first metric with a same metric for a plurality of storage systems; identifying by the processor, a plurality of features potentially impacting the first metric, based on a predictive, machine-learning algorithm built on performance and configuration data for the plurality of storage systems; selecting, a first feature by the processor, based on impact of the first feature on the first metric; and generating a command by the processor for making a change to the first feature.

20 Claims, 15 Drawing Sheets

ARTIFICIAL INTELLIGENCE AND MACHINE LEARNING SYSTEMS AND METHODS FOR A STORAGE SYSTEM

CROSS-REFERENCE TO RELATED APPLICATIONS

This patent application claims priority under 35 U.S.C. 119(a) to the Provisional Indian Patent Application, Serial No. 201841039576, entitled "Artificial Intelligence and Machine Learning Systems for a Storage System, filed on Oct. 18, 2018, the disclosure of which is incorporated herein by reference in its entirety.

TECHNICAL FIELD

The present disclosure relates to computing technology using machine learning (ML), artificial intelligence (AI) and natural language processing (NLP) for network storage system administration.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are typically managed by a storage administrator who relies on documentation provided by storage system providers, training and experience to make storage management decisions. This approach is inefficient since it relies heavily on the overall expertise of the storage administrator. Continuous efforts are being made to develop technology using AI/ML/NLP techniques for managing storage systems.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, novel computing technology based on AI (Artificial Intelligence)/ML (Machine Learning)/NLP (Natural Language Processing) techniques is provided to accelerate the expertise of a storage administrator to manage a storage system. The AI/ML based system identifies one or more vital signs that are indicative of the overall health of the storage system. The vital signs are measured for the storage system and compared to other similar storage systems. Based on the comparison, the vital signs are scored or quantified. The process identifies features that may potentially impact a vital sign based on machine learning and a predictive model. A specific feature is selected based on its overall impact to the vital sign. Using NLP, a command is generated to modify/configure the feature for improving the vital sign. The command is based on how a community of users may have configured the feature to improve the vital sign.

Figure 1A:
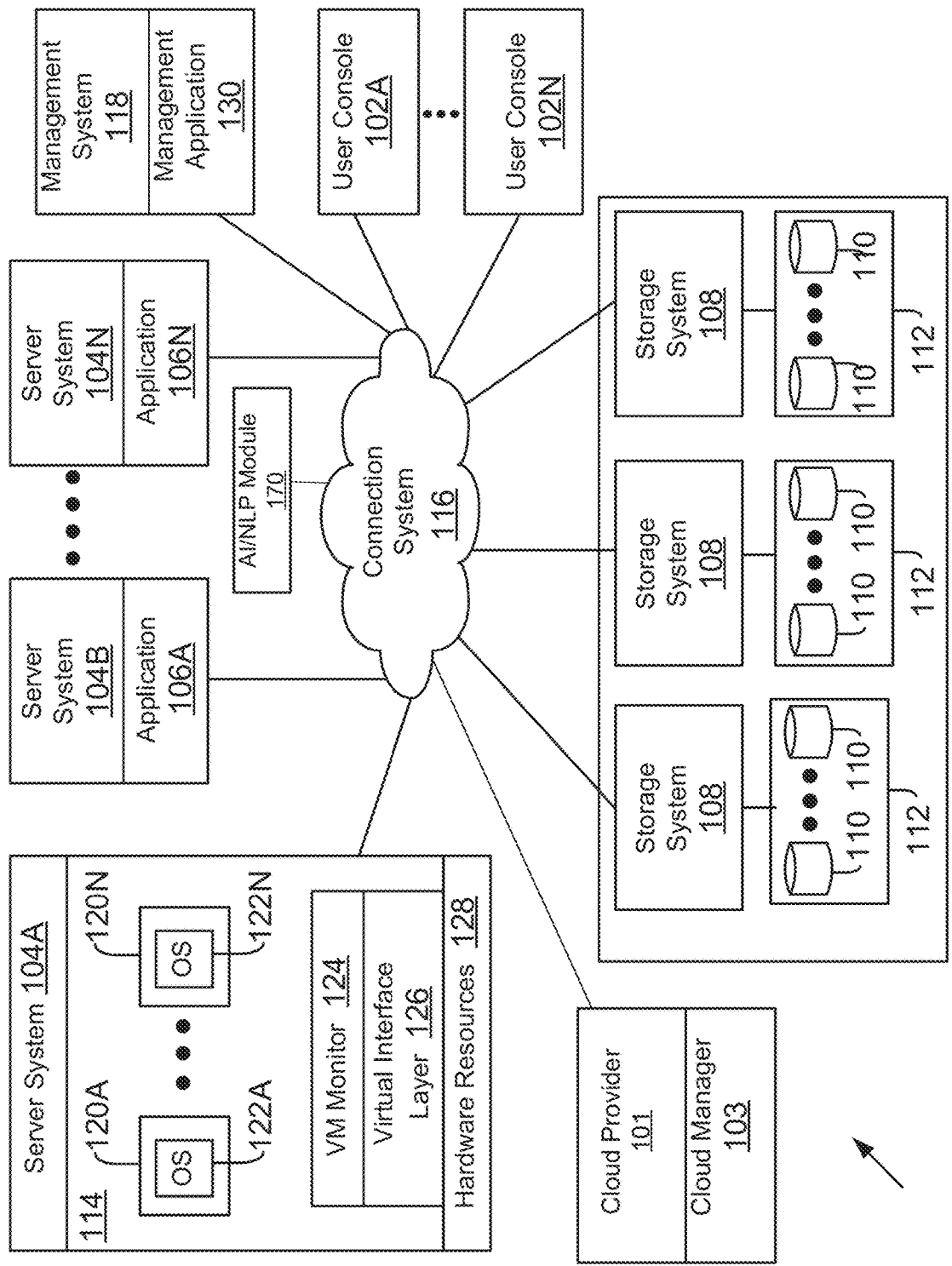
FIG. 1A shows an example of an operating environment for implementing the various aspects of the present disclosure.

System 100:

FIG. 1A shows an example of a networked operating environment 100 (also referred to as system 100), for implementing the various adaptive aspects of the present disclosure using AI/ML/NLP techniques executed by an AI/NLP module 170, described below in detail.

System 100 includes a management system 118 for managing and configuring various elements of system 100. Management system 118 may also execute the AI/ML/NLP related process blocks described below. Management system 118 may include one or more computing systems for retrieving storage system 108 performance/configuration related data and providing it to an AI data store. Management system 118 may also execute or include a management application 130 that processes performance data retrieved from storage system 108 described below in detail.

In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102).

A cloud provider 101 may be used to provide storage and storage related services (e.g. backup restore, cloning and other services) to clients. The cloud provider 101 may execute a cloud manager 103 for presenting storage and storage services associated with storage system 108. It is noteworthy that the cloud manager 103 may be a software layer executed by server systems 104 or any other computing device.

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program, an email program or any other computer executable program.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 114, according to one aspect. In the virtual machine environment 114, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 114 includes a plurality of VMs 120A-120N that execute a plurality of guest OS 122A-122N (may also be referred to as guest OS 122) to share hardware resources 128. As described above, hardware resources 128 may include CPU, memory, I/O devices, storage or any other hardware resource.

A virtual machine monitor (VMM) 124, for example, a processor executed hypervisor layer provided by VMWare Inc., Hyper-V layer provided by Microsoft Corporation (without derogation of any third party trademark rights) or any other virtualization layer type, presents and manages the plurality of guest OS 122. VMM 124 may include or interface with a virtualization layer (VIL) 126 that provides one or more virtualized hardware resource 128 to each guest OS. For example, VIL 126 presents physical storage at storage devices 110 as virtual storage (for example, as a virtual hard drive (VHD)) to VMs 120A-120N. The VMs use the VHDs to store information at storage devices 110.

In one aspect, VMM 124 is executed by server system 104A with VMs 120A-120N. In another aspect, VMM 124 may be executed by a separate stand-alone computing system, often referred to as a hypervisor server or VMM server and VMs 120A-120N are presented via another computer system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 124 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMs/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 120A-120N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

The storage system 108 maintains a plurality of counters (not shown) to track various performance parameters. For example, the storage system 108 tracks latency for processing input/output (I/O) requests for clients for each storage volume. The storage system 108 may also track the number IOPS for each volume, the storage capacity that is used for each volume and any rate of change of storage capacity utilization. The performance data maintained by the storage system 108 is provided to the management application 130.

In one aspect, storage system 108 may have a distributed architecture, for example, a cluster based system that may include a separate network module and storage module described below with respect to FIG. 2A. Briefly, the network module is used to communicate with server systems 104 and management system 118, while the storage module is used to communicate with the storage devices 110.

Figure 1B:
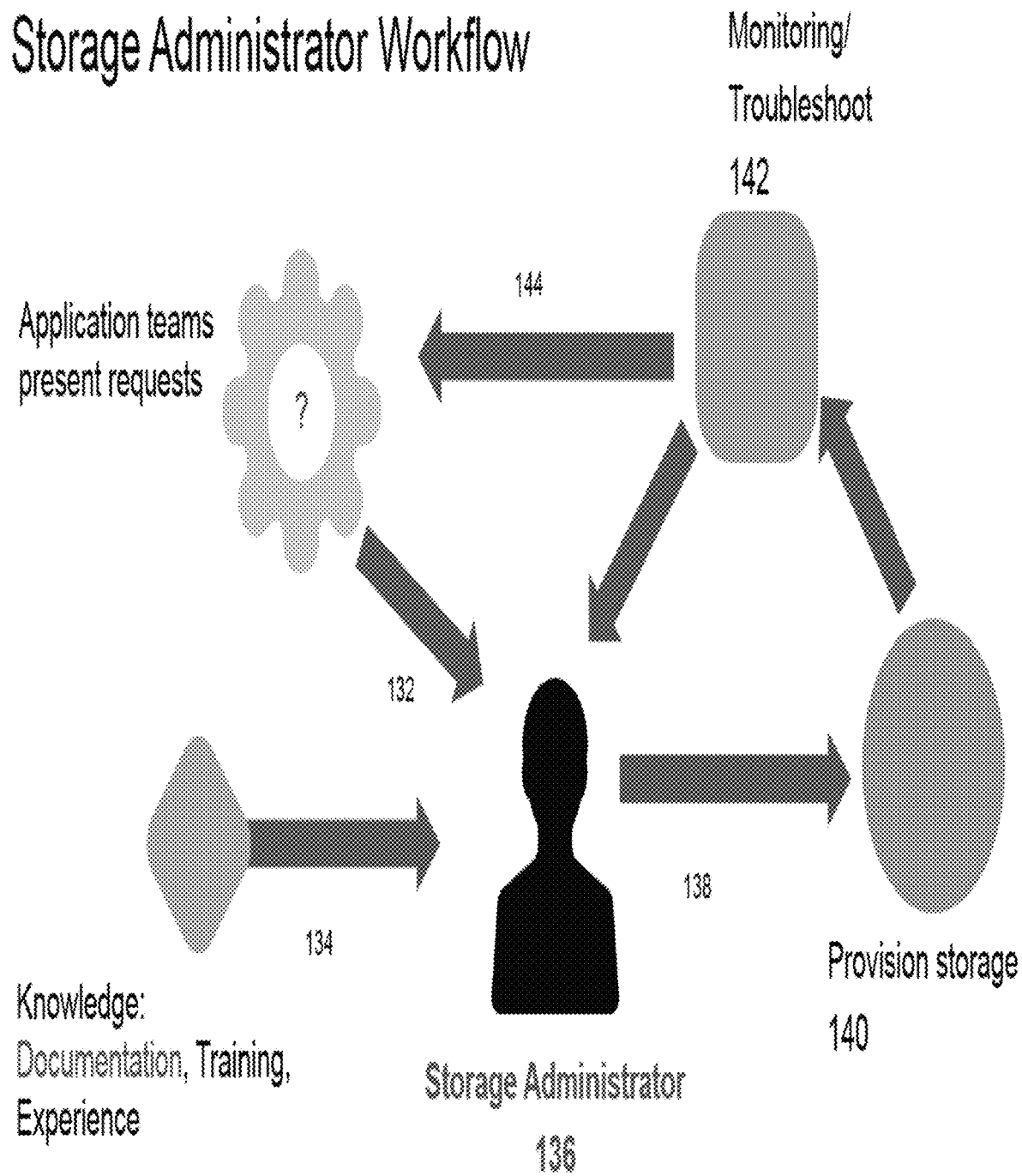
FIG. 1B shows an example of a storage administrator workflow without using artificial intelligence (AI) or machine learning (ML)

Storage Administrator Training: FIG. 1B highlights the various functions of a storage administrator 136 for managing a storage system. To become an expert in managing storage systems 108, the storage administrator 136 receives training, reads documentations and gains experience (134) over time for provisioning storage 140 (shown by 138). The storage administrator 136 uses the knowledge obtained by documentation/training/experience to troubleshoot and monitor storage systems (142). When the storage administrator 136 receives requests 132 from application teams, the storage administrator 136 uses its expertise to provide a response 144 to the application teams based on the monitoring 142. This is undesirable since it may take a long time to become an expert storage administrator considering the complex architecture and code base of networked storage systems.

Figure 1C:
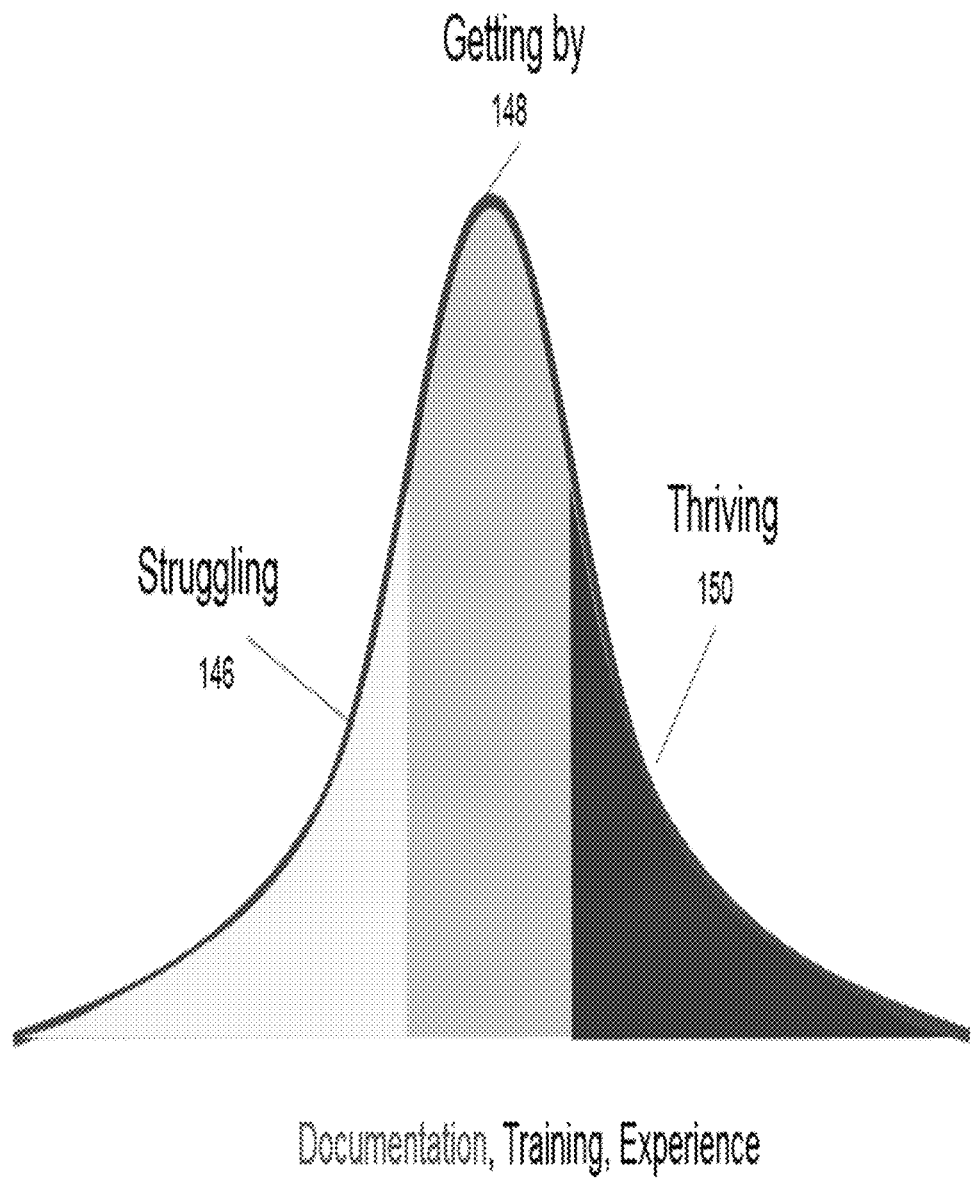
FIG. 1C graphically illustrates a timeline for training a storage administrator using conventional techniques.
Figure 1D:
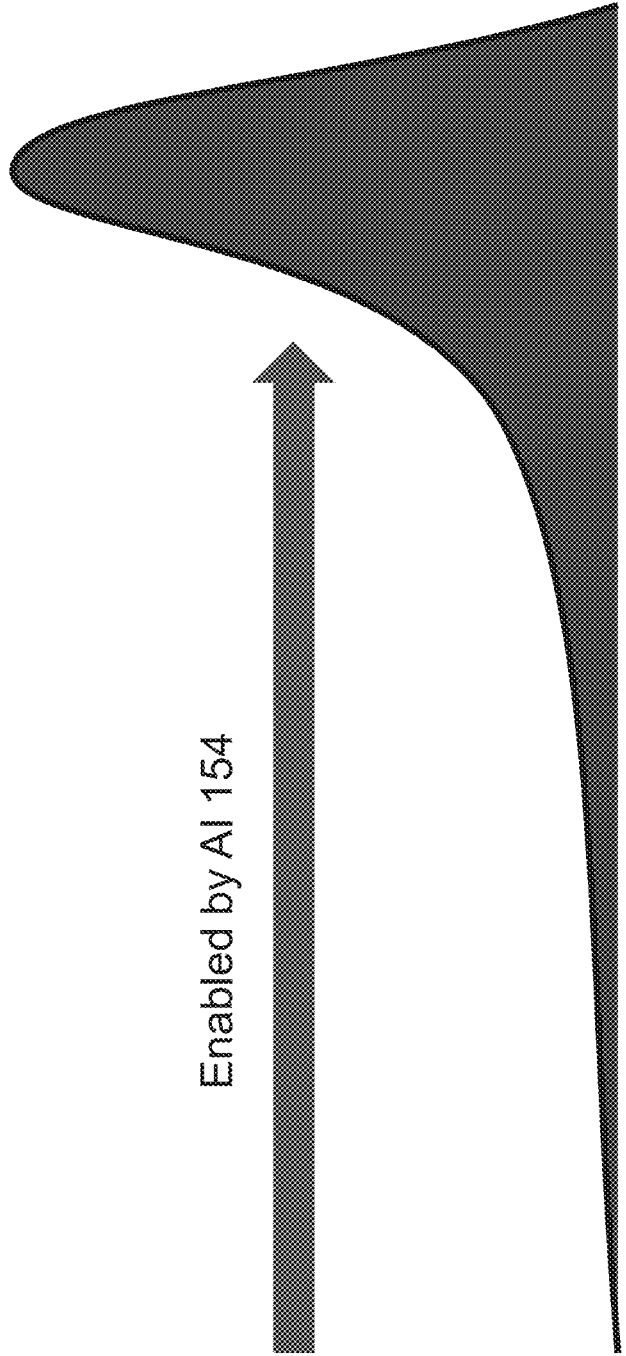
FIG. 1D shows a shortened timeline for storage administrator training using the AI/ML based technology of the present disclosure.

FIG. 1C shows a bell curve for training the storage administrator 136 using documentation/training/experience, under the conventional system, without use of AI/ML/NLP. In a first stage 146, the administrator struggles, in a second stage 148, the storage administrator "gets by" and in the final stage 150, the administrator may thrive. The overall duration to reach the third stage varies based on individual abilities, education and the effectiveness of the training/experience/documentation shown in FIG. 1B. In contrast, FIG. 1D shows how the AI enabled techniques 154 of the present disclosure can accelerate the "thriving" stage 152 for the storage administrator to reach an expert stage. This improves overall efficiency of managing storage systems. The use of AI/ML/NLP is described below in detail.

Figure 1E:
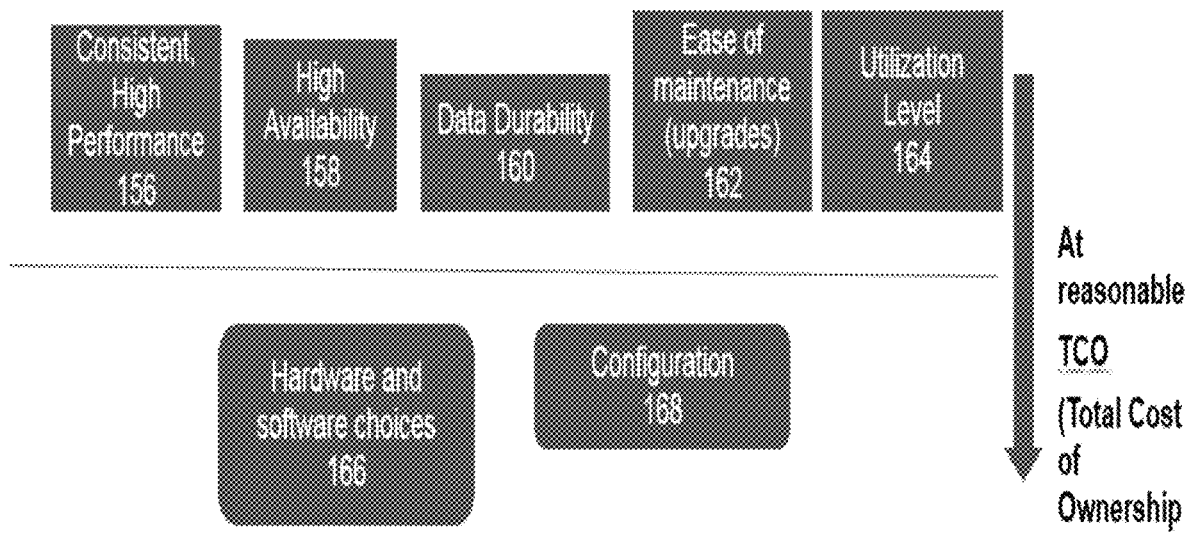
FIG. 1E shows examples of storage administration goals that are achieved using the AI/ML based technology of the present disclosure.

Vital Signs:

FIG. 1E provides an example of vital signs/metrics that can be used for indicating the overall health of a storage system 108 at a reasonable, total cost of ownership (TCO). The vital signs include consistent high performance 156, high availability 158, data durability 160, ease of maintenance 162 and storage system utilization levels 164. High performance 156 is based on consistently processing I/O (Input/Output) requests to store and read data within a certain latency/delay. The high availability 158 indicates a system's availability for use i.e. uptime/downtime of a system. The data durability 160 indicates the extent of data loss, if any. The ease of maintenance 162 indicates the ease with which a system can be maintained, while utilization level 164 indicates a degree of utilization of a storage system. Based on the vital signs, a storage administrator may select certain hardware/software components 166 in one or more configurations 168, as described below in detail.

Figure 1F:
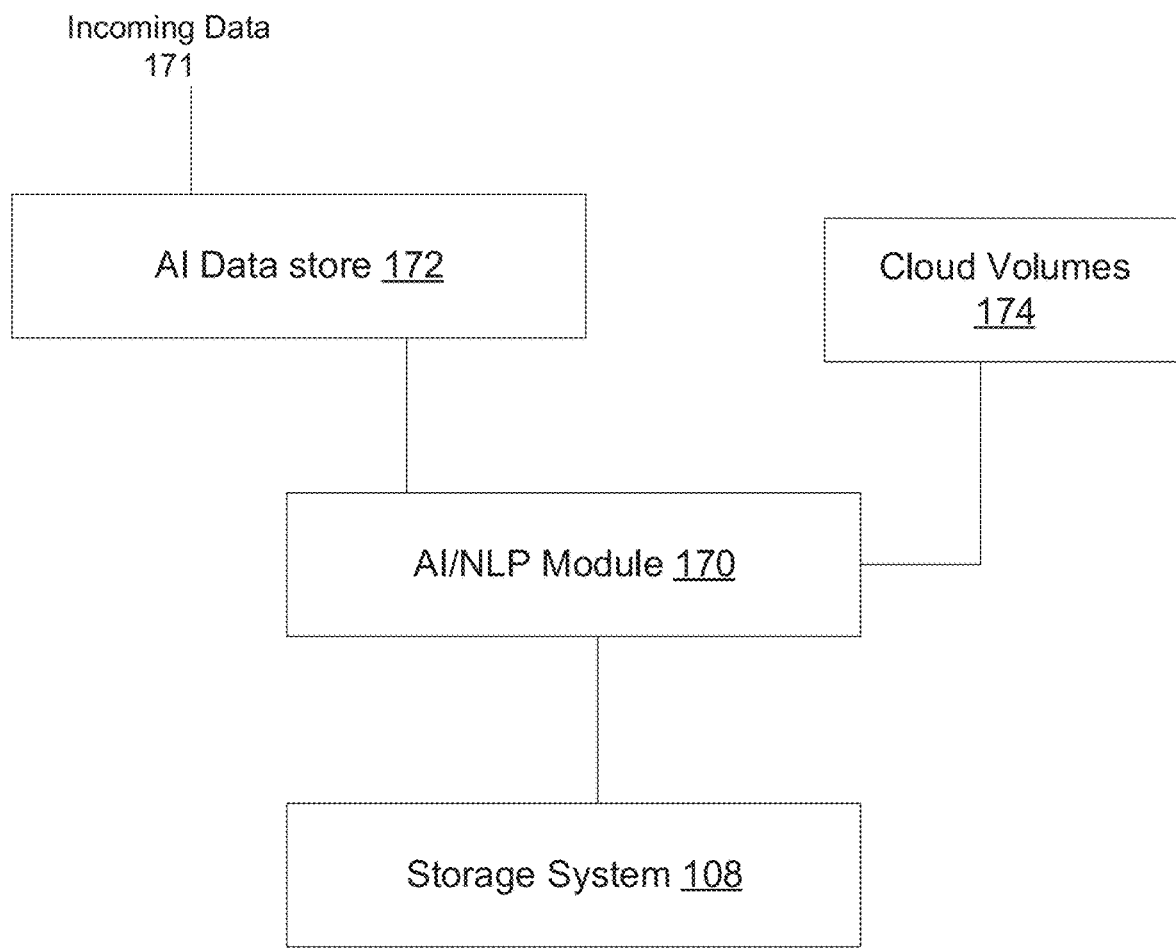
FIG. 1F shows a block diagram of a system using an AI/Natural Language Processing (NLP) module, according to one aspect of the present disclosure.

AL Module 170/AI Data Store 172: FIG. 1F shows a high-level system block diagram with an AI data store 172 that is maintained by the AI/NLP module (may be referred to as AI module or NLP module) 170, according to one aspect of the present disclosure. It is noteworthy that the AI module may be integrated with management system 118/management application 130. The data store 172 receives performance, configuration and other storage system data (shown as incoming data 171, may also be referred to as "telemetry data") involving various storage volumes being used by clients to store and retrieve data. As an example, the incoming data 171 may be received from "AUTOSUPPORT" OR "ACTIVEIQ", a software/hardware service infrastructure, provided by NetApp Inc., the assignee of the present application (without derogation of any trademark rights).

The incoming data 171 is from a community of users that use the storage system 108 for storing and retrieving data. The community of users use storage systems with a variety of workloads for different applications. The incoming data indicates performance levels measured by latency, service times, wait times, delays, and utilization levels and provides configuration information for the community of users. For example, the incoming data provides information on software/hardware configuration, decisions made by storage management systems to improve the health/vital signs of storage systems including upgrade/configuration changes. The AI/ML/NLP processes disclosed herein leverage the community usage/decisions/opinions with respect to identifying vital signs for efficiently managing storage systems and then providing customized recommendations/prescriptions, as described below.

Figure 1G:
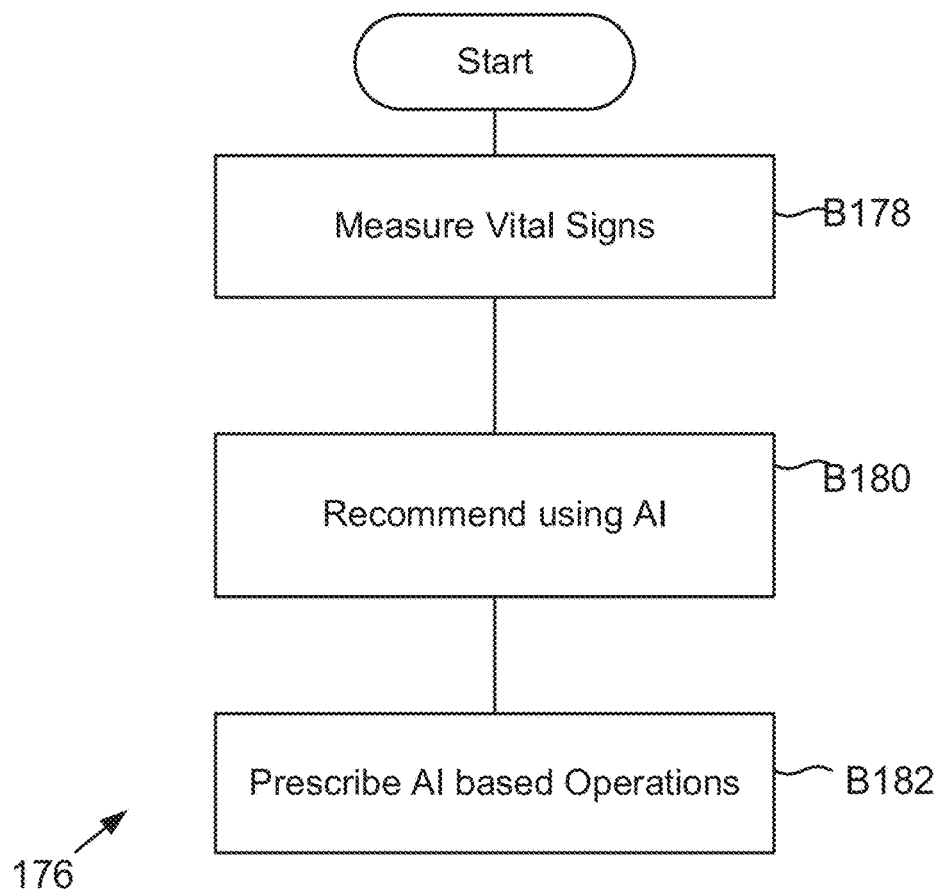
FIG. 1G shows a block diagram for managing vital signs of a storage system, according to one aspect of the present disclosure.

Process Flows:

FIG. 1G shows a high-level, computer executable process 176 of the present disclosure using AI/ML/NLP for storage system management. Process 176 includes block B178 for measuring the vital signs for a storage system described below in detail with respect to FIG. 1H. The vital signs related data is provided to the AI module 170 that maintains the AI data store 172. In block B180, the AI module 170 compares the vital signs with community or crowd sourced data and determines a relative score. The relative score is quantified, e.g. as being "good", "average" or poor". The AI module 170 provides an output in block B182 that is used for providing specific commands (or "prescription") to improve a vital sign by a "prescribe" module. The commands may be used for automated configuration changes to a storage system including upgrade of software/hardware systems.

Figure 1H:
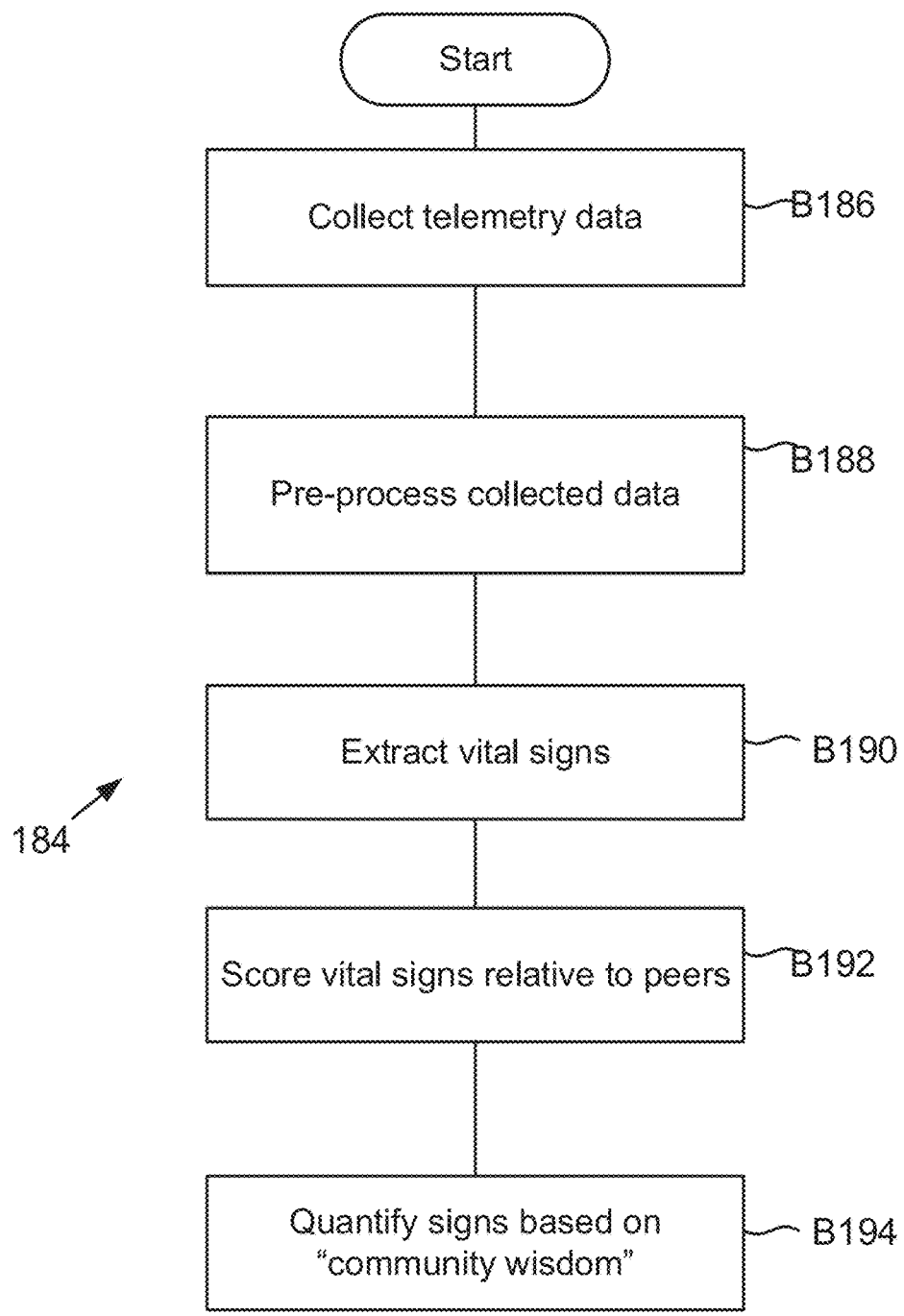
FIG. 1H shows a detailed process flow for measuring a vital sign, according to one aspect of the present disclosure.

FIG. 1H shows a process 184 with details of block B178 of FIG. 1G, according to one aspect of the present disclosure. In block B186, telemetry data is collected for a specific storage system 108. This data is related to the vital signs described above with respect to FIG. 1E. The data may be collected by management system 118. In block B188, the data is curated and various parameters/metrics for the vital signs are extracted in block B190. The parameters and metrics may be extracted by AI module 170 or management application 130. In block B192, the AI module 170 assigns scores to the vital signs, relative to peer storage systems. The peer information is stored at the AI data store 172. In block B194, the scores are quantified based on a community of users to indicate if a vital sign is good, average or poor.

To illustrate process 184, as an example, assume that the process is intended to measure and improve an "uptime" for a networked storage system. This involves measuring uptime (i.e. availability) of a storage system by the management system 118. A planned downtime for a storage system is considered acceptable, while an unplanned downtime is undesirable. A relative score of 9 that indicates that the uptime is better than 90% of other similar systems may be considered a good score, while a relative score of 1 that indicates the uptime to be in the bottom 10% of similar systems may be considered poor.

Figure 1I:
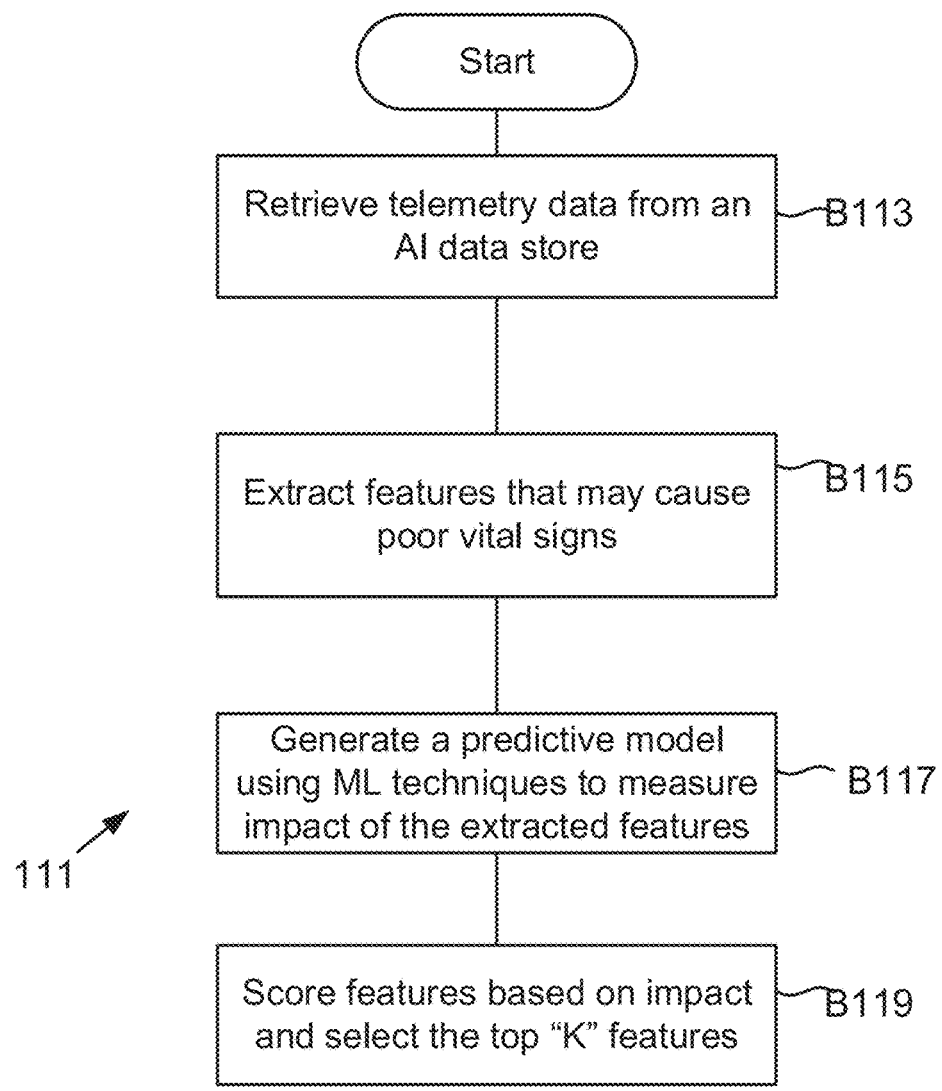
FIG. 1I shows a process flow for identifying features impacting a vital sign of a storage system, according to one aspect of the present disclosure.

FIG. 1I shows a process 111 for block B180 of FIG. 1G that is executed by the AI module 170, according to one aspect of the present disclosure. The example of FIG. 1I is based on identifying risks that predict downtime for a storage system 108.

In one aspect, in block B113, the AI module 170 retrieves telemetry data from the AI data store 172. In block B115, the AI module 170 extracts a plurality of features that may be potential causes for a poor vital sign. For example, the features may include whether a storage system has the latest software, if it is under a support contract, if best practices are being used by a system and other features. It is noteworthy that there may be numerous features that may impact a vital sign.

In block B117, the AI module 170 uses machine learning to build predictive models to measure the impact of the extracted features on the quality of the vital signs. In block B119, the features are scored based on impact and the top "K" features are selected using certain ML techniques, e.g. Random Forrest ML model training, Support vector machines (SVM) or any other technique. The adaptive aspects are not limited to any specific ML modelling technique.

Figure 1J:
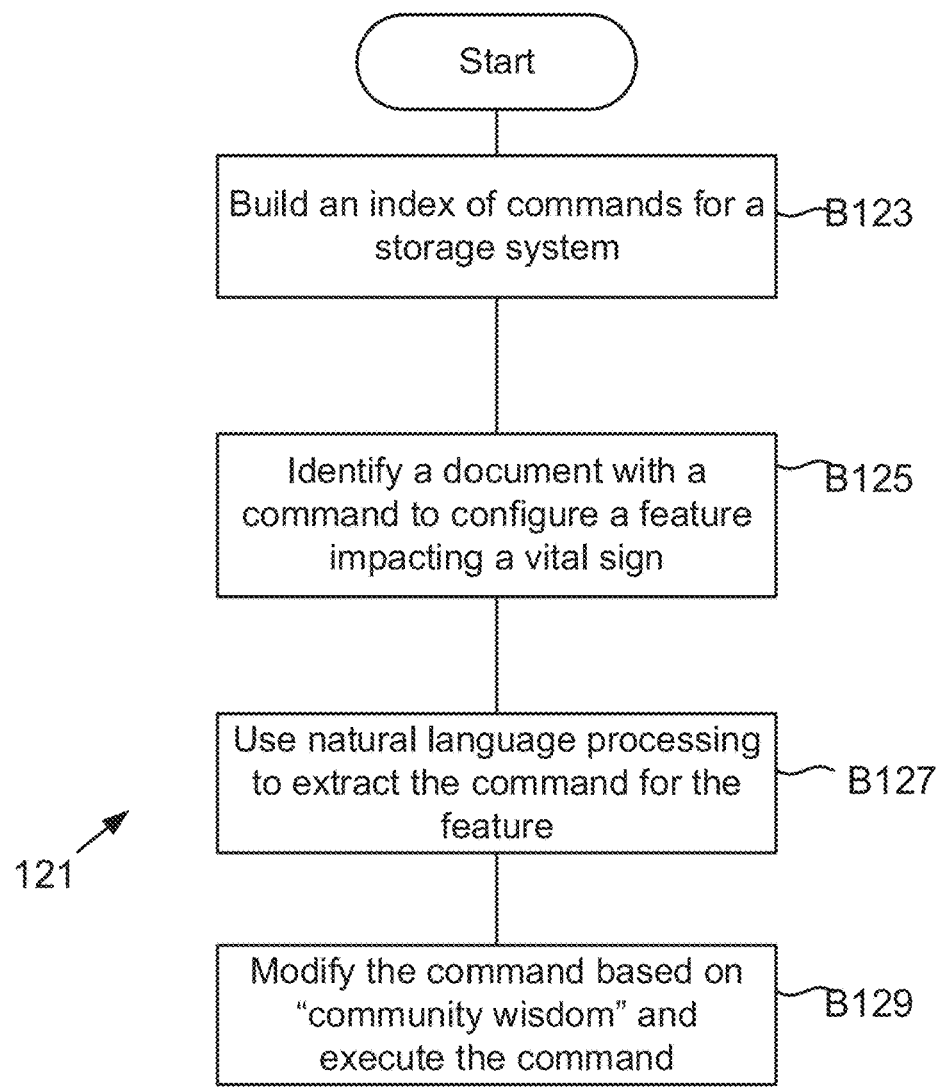
FIG. 1J shows a process for using NLP for modifying a feature impacting the vital sign of the storage system, according to one aspect of the present disclosure.

FIG. 1J shows a process 121 for implementing the process block B182 (FIG. 1E) for using AI/ML for providing custom recommendations/commands using NLP for improving a vital sign.

In conventional systems today, as an example, a parameter "set auto give back to true" is used by storage systems to improve uptime. A user is typically directed to read a certain document (e.g. a "KB article 2345") for a configuration setting if the user wants to improve system uptime. In contrast to conventional techniques, the AI based process uses NLP to provide the command for setting the parameter to "true". The command may be executed automatically, minimizing user intervention.

In one aspect, at a high level, the prescription process builds an index of all commands that are used in configuring storage systems. The commands are typically developed by a storage system provider and available in storage system documentation. For each feature that impacts a vital sign, a command is identified to configure the feature. NLP is used to extract the command from the documentation and then a customized output based on community wisdom is provided to a user. This is referred to as "intent based configuration."

Referring to FIG. 1J, in block B123, an index of all the commands used by the storage system 108 is built. The index of commands may be stored at the AI data store 172. In block B125, a document is identified to configure a feature determined in block B119 of FIG. 1I. The AI module 170 extracts a command associated with the feature in block B127. The command may be modified in block B129. The modification may be based on how a community of other users may have used the command. For example, if a command provides options 1-5 for a specific configuration setting and a community of users have successfully used option 3 to configure the feature, then the AI module 170 provides an output such that option 3 is highlighted as being a setting that has been successfully used. In another aspect, the setting that has been used successfully may be automatically executed by a computing component associated with the feature.

Figure 1K:
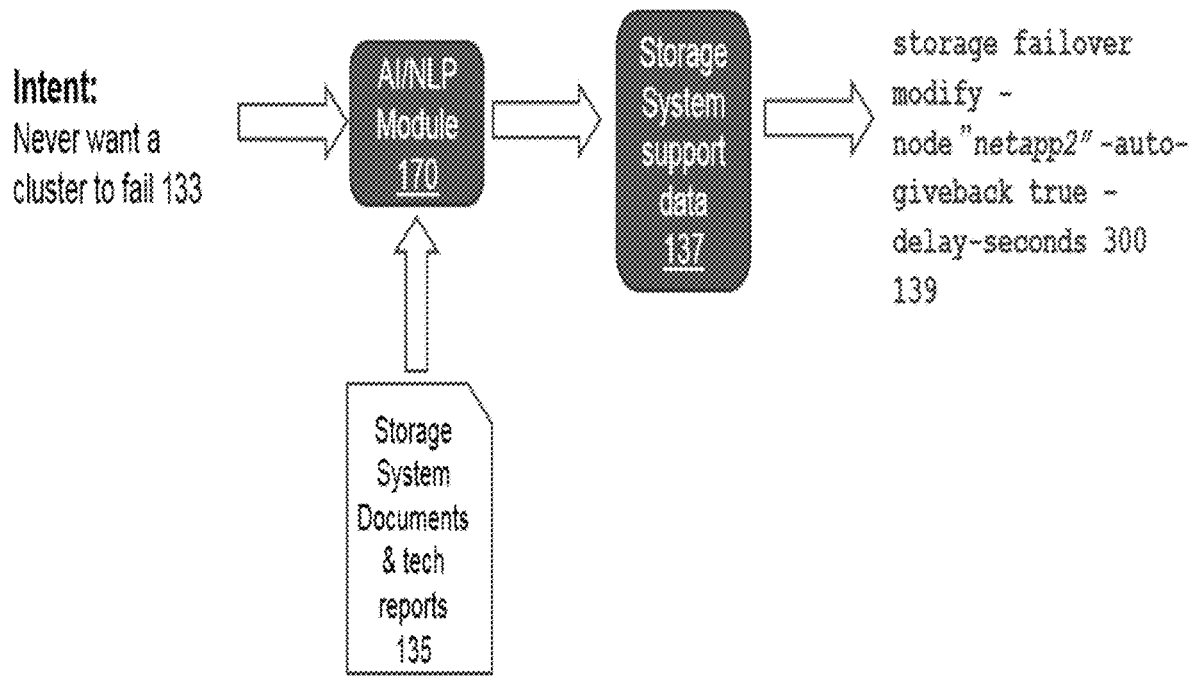
FIG. 1K shows a system for using NLP in managing the feature impacting the vital sign of the storage system, according to one aspect of the present disclosure.

FIG. 1K shows an example of intent-based configuration using the AI/ML/NLP techniques of the present disclosure, described above with respect to FIG. 1J. As an example, the intent 133 may be defined as "never want a cluster to fail". The intent is provided to the NLP/AI module 170 that receives electronic storage system configuration documents 135. An output 139 is provided using storage system support data 137.

Figure 1L:
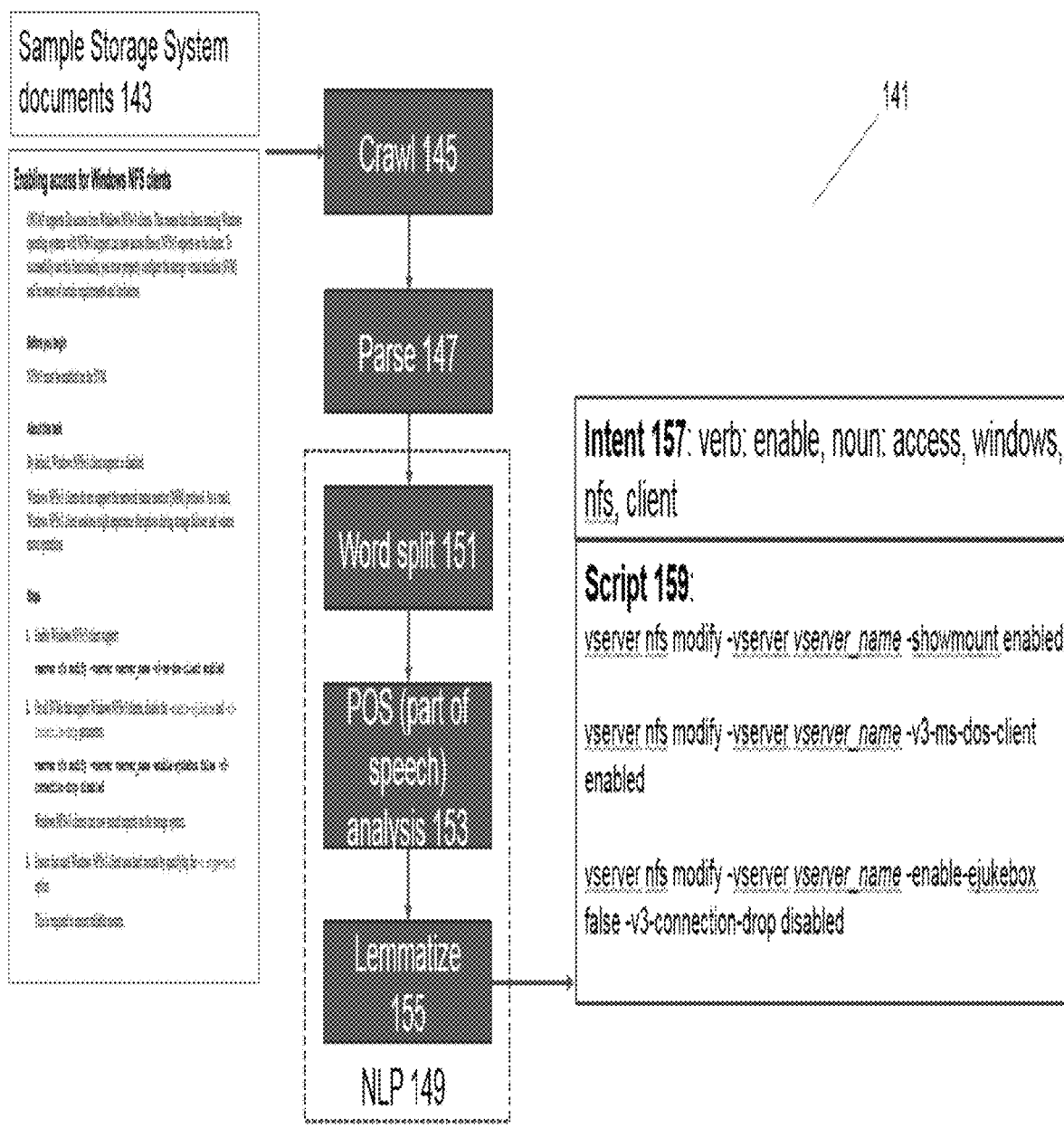
FIG. 1L shows a NLP based process for managing a feature impacting the vital sign of the storage system, according to one aspect of the present disclosure.

FIG. 1L shows another example of a detailed process flow 141 for the intent-based configuration of FIG. 1K. In one aspect, storage documents 143 are retrieved from a storage device (shown as "crawl 145"). The documents are then parsed (147). The NLP processing by the AI/NLP module 170 is shown within block 149. The AI/NLP module 170 performs a "word split" (151) and executes a POS (part of speech) analysis (153). The POS is then sorted or lemmatized (155). An example of the Intent (157) and a script output 159 are shown as an example in FIG. 1L.

In one aspect, using AI/ML, storage administration of a networked storage system is automated and reduces reliance on individual human expertise that takes a long time to develop. The technology disclosed herein can be rapidly deployed in different operating environments.

In one aspect, method and systems using AI/ML/NLP are provided. One method includes quantifying by a processor, a first metric for a first storage system, based on comparison of the first metric with a same metric associated with a plurality of storage systems used by a plurality of users. The first metric indicates overall health of the first storage system for storing and retrieving data; and use of the same metric at the plurality of storage systems is used to quantify the first metric.

The method further includes identifying by the processor, a plurality of features potentially impacting the first metric; executing by the processor, a predictive, machine learning algorithm to generate a model to measure an impact of the plurality of features on the first metric; using the model by the processor, to determine a score for each feature, the score representing the impact of each feature on the first metric; selecting a first feature by the processor, based on a score of the first feature, indicating an impact of the first feature on the first metric; identifying by the processor, a command for the first feature using an index of commands for the first storage system and an electronic document that includes the command to configure the first feature; extracting by the processor, the command from the electronic document; and generating by the processor, an output to make a change to the first feature, the output based on the command and historical use of the command by the plurality of storage systems.

Figure 2A:
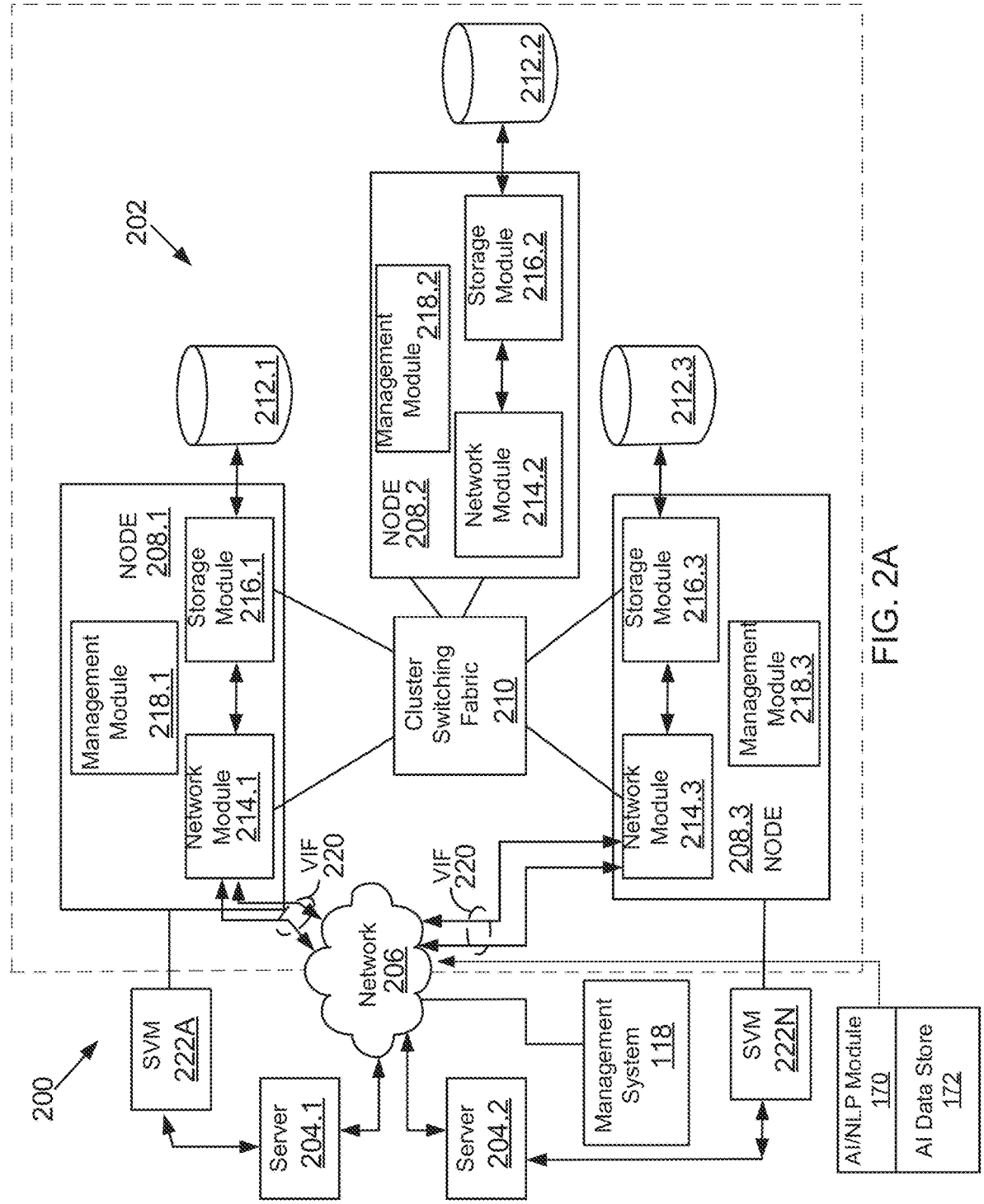
FIG. 2A shows an example of a clustered storage system, used according to one aspect of the present disclosure.

Clustered Storage System:

FIG. 2A depicts an illustrative aspect of a shared, storage environment 200 using the management system 118 and the AI module 170 with AI data store 172. The shared, storage environment 200 includes the cloud provider 101 (not shown in FIG. 2A), a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
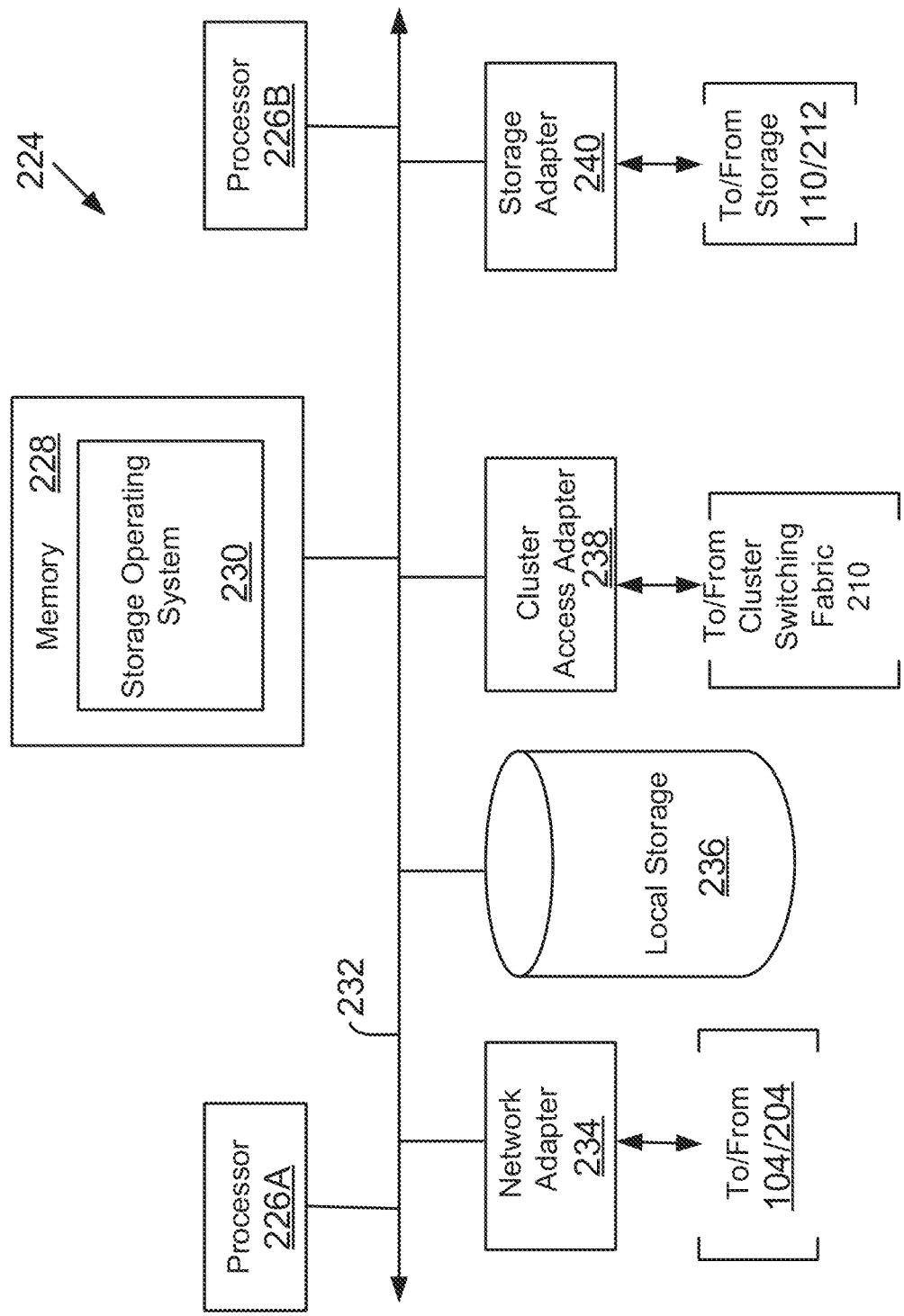
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
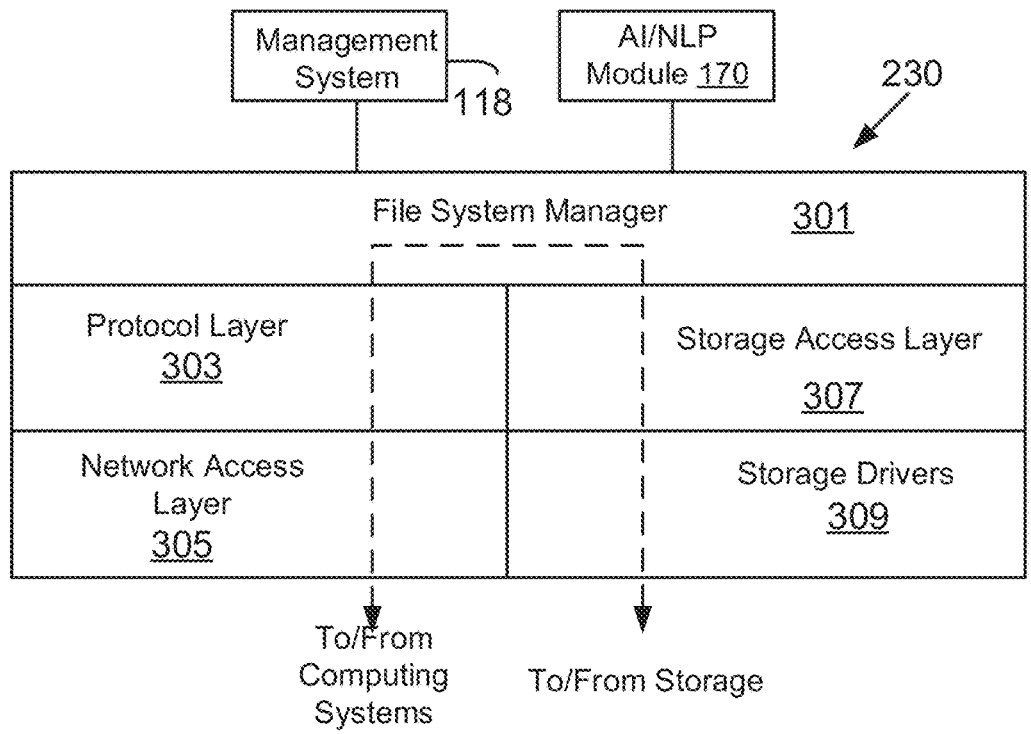
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 for providing performance data that can be used by the AI module 170, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
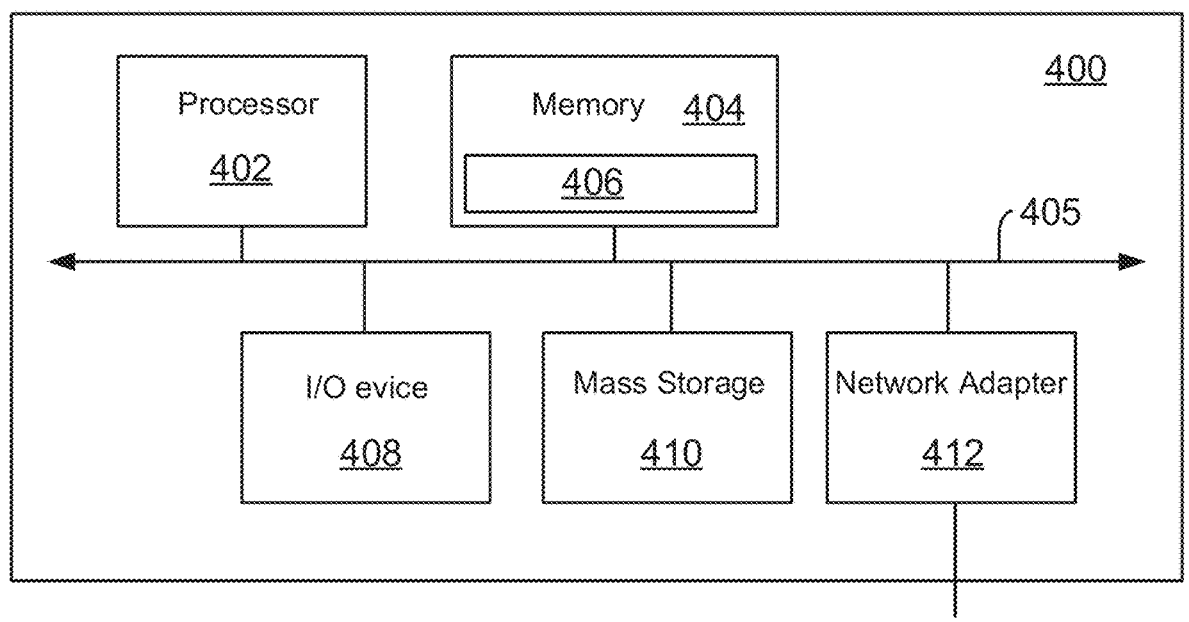
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 200 can represent modules of the AI module 170, management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1G-1K.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services.

Thus, computing technology for using AI/ML/NLP for storage systems have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

quantifying by a processor, a first metric for a first storage system, based on comparison of the first metric with a same metric associated with a plurality of storage systems used by a plurality of users;

wherein the first metric indicates overall health of the first storage system for storing and retrieving data; and use of the same metric at the plurality of storage systems is used to quantify the first metric;

identifying by the processor, a plurality of features potentially impacting the first metric;

executing by the processor, a predictive, machine learning algorithm to generate a model to measure an impact of the plurality of features on the first metric;

using the model by the processor, to determine a score for each feature, the score representing the impact of each feature on the first metric;

selecting a first feature by the processor, based on a score of the first feature, indicating an impact of the first feature on the first metric;

identifying by the processor, a command for the first feature using an index of commands for the first storage system and an electronic document that includes the command to configure the first feature;

extracting by the processor, the command from the electronic document; and generating by the processor, an output to make a change to the first feature, the output based on the extracted command and historical use of the extracted command by the plurality of storage systems.

2. The method of claim 1, wherein the first metric is indicative of performance of the first storage system.

3. The method of claim 1, wherein the first metric is indicative of utilization of the first storage system.

4. The method of claim 1, wherein the first metric is indicative of data loss by the first storage system.

5. The method of claim 1, wherein the first metric is indicative of maintainability of the first storage system.

6. The method of claim 1, wherein the first metric is indicative of availability of the first storage system.

7. The method of claim 1, wherein the extracted command is generated using natural language processing.

8. A non-transitory machine readable storage medium having stored thereon instructions for performing a method, comprising machine executable code which when executed by at least one machine, causes the machine to:
  quantify by a processor, a first metric for a first storage system, based on comparison of the first metric with a same metric associated with a plurality of storage systems used by a plurality of users;
  wherein the first metric indicates overall health of the first storage system for storing and retrieving data; and use of the same metric at the plurality of storage systems is used to quantify the first metric;
  identify by the processor, a plurality of features potentially impacting the first metric;
  execute by the processor, a predictive, machine learning algorithm to generate a model to measure an impact of the plurality of features on the first metric;
  use the model by the processor, to determine a score for each feature, the score representing the impact of each feature on the first metric;
  select a first feature by the processor, based on a score of the first feature, indicating an impact of the first feature on the first metric;
  identify by the processor, a command for the first feature using an index of commands for the first storage system and an electronic document that includes the command to configure the first feature;
  extract by the processor, the command from the electronic document; and
  generate by the processor, an output to make a change to the first feature, the output based on the extracted command and historical use of the extracted command by the plurality of storage systems.

9. The storage medium of claim 8, wherein the first metric is indicative of performance of the first storage system.

10. The storage medium of claim 8, wherein the first metric is indicative of utilization of the first storage system.

11. The storage medium of claim 8, wherein the first metric is indicative of data loss by the first storage system.

12. The storage medium of claim 8, wherein the first metric is indicative of maintainability of the first storage system.

13. The storage medium of claim 8, wherein the first metric is indicative of availability of the first storage system.

14. The storage medium of claim 8, wherein the extracted command is generated using natural language processing.

15. A system comprising:
  a memory containing machine readable medium comprising machine executable code having stored thereon instructions; and a processor module coupled to the memory to execute the machine executable code to:
  quantify a first metric for a first storage system, based on comparison of the first metric with a same metric associated with a plurality of storage systems used by a plurality of users;
  wherein the first metric indicates overall health of the first storage system for storing and retrieving data; and use of the same metric at the plurality of storage systems is used to quantify the first metric;
  identify a plurality of features potentially impacting the first metric;
  execute a predictive, machine learning algorithm to generate a model to measure an impact of the plurality of features on the first metric;
  use the model to determine a score for each feature, the score representing the impact of each feature on the first metric;
  select a first feature, based on a score of the first feature, indicating an impact of the first feature on the first metric;
  identify a command for the first feature using an index of commands for the first storage system and an electronic document that includes the command to configure the first feature;
  extract the command from the electronic document; and
  generate an output to make a change to the first feature, the output based on the extracted command and historical use of the extracted command by the plurality of storage systems.

16. The system of claim 15, wherein the first metric is indicative of performance of the first storage system.

17. The system of claim 15, wherein the first metric is indicative of utilization of the first storage system.

18. The system of claim 15, wherein the first metric is indicative of data loss by the first storage system.

19. The system of claim 15, wherein the first metric is indicative of maintainability of the first storage system.

20. The system of claim 15, wherein the first metric is indicative of availability of the first storage system.

* * * * *